United States Patent
Wong

(10) Patent No.: US 9,486,098 B2
(45) Date of Patent: Nov. 8, 2016

(54) TOOL FOR PREPARING AN AVOCADO

(71) Applicant: King's Flair Development Ltd., Hong Kong (HK)

(72) Inventor: Siu Wah Wong, Hong Kong (HK)

(73) Assignee: KING'S FLAIR DEVELOPMENT LTD., Hong Kong (HK)

(*) Notice: Subject to any disclaimer, the term of this patent is extended or adjusted under 35 U.S.C. 154(b) by 125 days.

(21) Appl. No.: 14/245,253

(22) Filed: Apr. 4, 2014

(65) Prior Publication Data

US 2015/0282658 A1    Oct. 8, 2015

(51) Int. Cl.
| | | |
|---|---|---|
| *A47J 17/00* | (2006.01) | |
| *A47J 25/00* | (2006.01) | |
| *A47J 17/02* | (2006.01) | |
| *B26B 3/04* | (2006.01) | |
| *B26D 3/28* | (2006.01) | |

(52) U.S. Cl.
CPC .............. *A47J 17/02* (2013.01); *B26B 3/04* (2013.01); *B26D 2003/288* (2013.01)

(58) Field of Classification Search
CPC .... A47J 17/02; B26D 3/04; B26D 2003/288
USPC ......... 30/115–117, 114, 278, 30, 123.5, 245, 30/250, 302, 303, 279.2, 279.4, 279.6, 30/280, 149, 136, 123.6; 99/540, 545, 541
See application file for complete search history.

(56) References Cited

U.S. PATENT DOCUMENTS

| | | | | |
|---|---|---|---|---|
| 2,709,298 | A * | 5/1955 | Mater ................... | B26B 17/00 30/117 |
| 5,613,431 | A * | 3/1997 | Tateno .................. | A47J 17/02 30/114 |
| 7,055,247 | B2 * | 6/2006 | Kaposi .................. | B26D 3/26 30/114 |
| 7,080,454 | B2 * | 7/2006 | Holcomb ............... | A47J 17/02 30/114 |
| 7,421,786 | B2 * | 9/2008 | Dorion .................. | A47J 17/02 30/114 |
| D682,632 | S  * | 5/2013 | Krus ...................... | B26B 3/04 D7/693 |
| 8,726,799 | B2 * | 5/2014 | Prommel ............... | A47J 23/00 30/303 |
| 2011/0192036 | A1 * | 8/2011 | Holcomb ............... | B26B 3/04 30/279.2 |

* cited by examiner

*Primary Examiner* — Omar Flores Sanchez
(74) *Attorney, Agent, or Firm* — Nyemaster Goode P.C.

(57) ABSTRACT

The present invention relates to a tool for preparing an avocado, which comprises a scoop and a slicer. The tool is transformable between a first state in which the scoop and the slicer are positioned at a same end of the tool and used cooperatively to scoop and slice the pulp of the avocado simultaneously, and a second state in which the scoop and the slicer are positioned at opposite ends of the tool and used separately.

15 Claims, 3 Drawing Sheets

TOOL FOR PREPARING AN AVOCADO

TECHNICAL FIELD OF THE INVENTION

This invention relates generally to a tool for preparing an avocado, and particularly, to a tool capable of scooping, or slicing an avocado, or both.

BACKGROUND OF THE INVENTION

Avocadoes can be prepared for consumption in various manners. Typically, an avocado is first cut into halves and the recess is removed. Then the meat is scooped out from the skin. After that, the meat can be consumed directly. The meat can also be sliced into slices or cubic blocks for various consumption occasions. Different tools are needed for preparation of different shapes of the avocado fruits. If the avocado halves are to be consumed directly, a simple scoop typically with an oval-shaped loop can be used to scoop out the whole meat. If the avocado is to be served in slices or cubes, a slicer or other sharp implement needs to be used. To save costs for kitchen tools as well as space required for storage, multi-purpose avocado preparation tools that can scoop or slice the fruit or both are developed.

For example, U.S. Pat. No. 7,055,247 describes an avocado slicer having a handle, a curved blade, and a plurality of internal cutting blades. The blades separate the meat of the avocado from the skin while the internal cutting blades simultaneously slice the meat into separate slices. U.S. Pat. No. 7,421,786 describes an avocado slicer including a frame, and a plurality of slicing elements extending within the frame, wherein the slicing elements are substantially parallel to each other.

However, these avocado slicers are only suitable for preparing the avocado in slices. If the avocado is to be prepared unsliced or in cubic blocks, other tools need to be used. A tool for preparing an avocado which can be adapted or transformed to prepare the avocado in different manners is not found in the prior art.

SUMMARY OF THE INVENTION

The present invention has a principle object of providing a tool for preparing an avocado which can be adapted to prepare the avocado in different manners. More particularly, the present invention aims to provide a tool comprising a scoop and a slicer, wherein the tool is transformable between first and second states. In the first state, the scoop and the slicer are positioned at a same end of the tool and used cooperatively to scoop and slice the meat of the avocado simultaneously. In the second state, the scoop and the slicer are positioned at opposite ends of the tool and used separately, wherein the meat of the avocado is scooped out and sliced separately.

These and other objects are satisfied by the present invention, which provides a tool for preparing an avocado, comprising a scoop comprising a scoop handle having first and second end portions, and a loop extending from the first end portion of the scoop handle and adapted for scooping out pulp of the avocado. The tool further comprises a slicer comprising a slicer handle having a first end portion pivotally mounted to the second end portion of the scoop handle and a second end portion, and a plurality of slicing elements mounted to the second end portion of the slicer handle. The plurality of slicing elements are configured and adapted to pivot into the loop so as to be received within the loop of the scoop. Preferably, the plurality of slicing elements are in alignment with the loop when received within the loop of the scoop.

The first end portion of the slicer is pivotally mounted to the second end portion of the scoop handle through a hinge from moving the slicer into the loop or moving the slicer away from the loop.

In one embodiment of the present invention, the scoop handle has two opposite side panels to define a channel adapted for accommodating the slicer handle when the slicing elements pivots into the loop.

Preferably, at least one of the side panels comprises a first projection at the second end portion of the scoop handle, and the slicer handle comprises at least one recess configured to snap-fit the respective first projection when the slicing elements pivots into the loop, so as to prevent movement of the slicer relative to the scoop.

In one embodiment of the present invention, at least one of the side panels comprises a second projection at the first end portion of the scoop handle, and the slicer handle comprises at least one recess configured to snap-fit the respective second projection when the slicing elements and the loop are at opposite ends of the tool, so as to prevent movement of the slicer relative to the scoop.

In one embodiment of the present invention, the scoop handle further comprises an intermediate portion between the scoop handle and the loop, and a surface of the slicer handle, which is positioned to correspond to the intermediate portion, is adapted to receive the intermediate portion in flush fashion when the slicing elements pivots into the loop.

Preferably, the slicing elements consist in blades in spaced relation, each of which has a hooked proximal end firmly held in respective hook-shaped slots of the second end portion of the slicer handle.

DETAILED DESCRIPTION OF THE INVENTION

While this invention is illustrated and described in preferred embodiments, the tool of the present invention may be produced in many different configurations, sizes, forms and materials.

Figure 1:
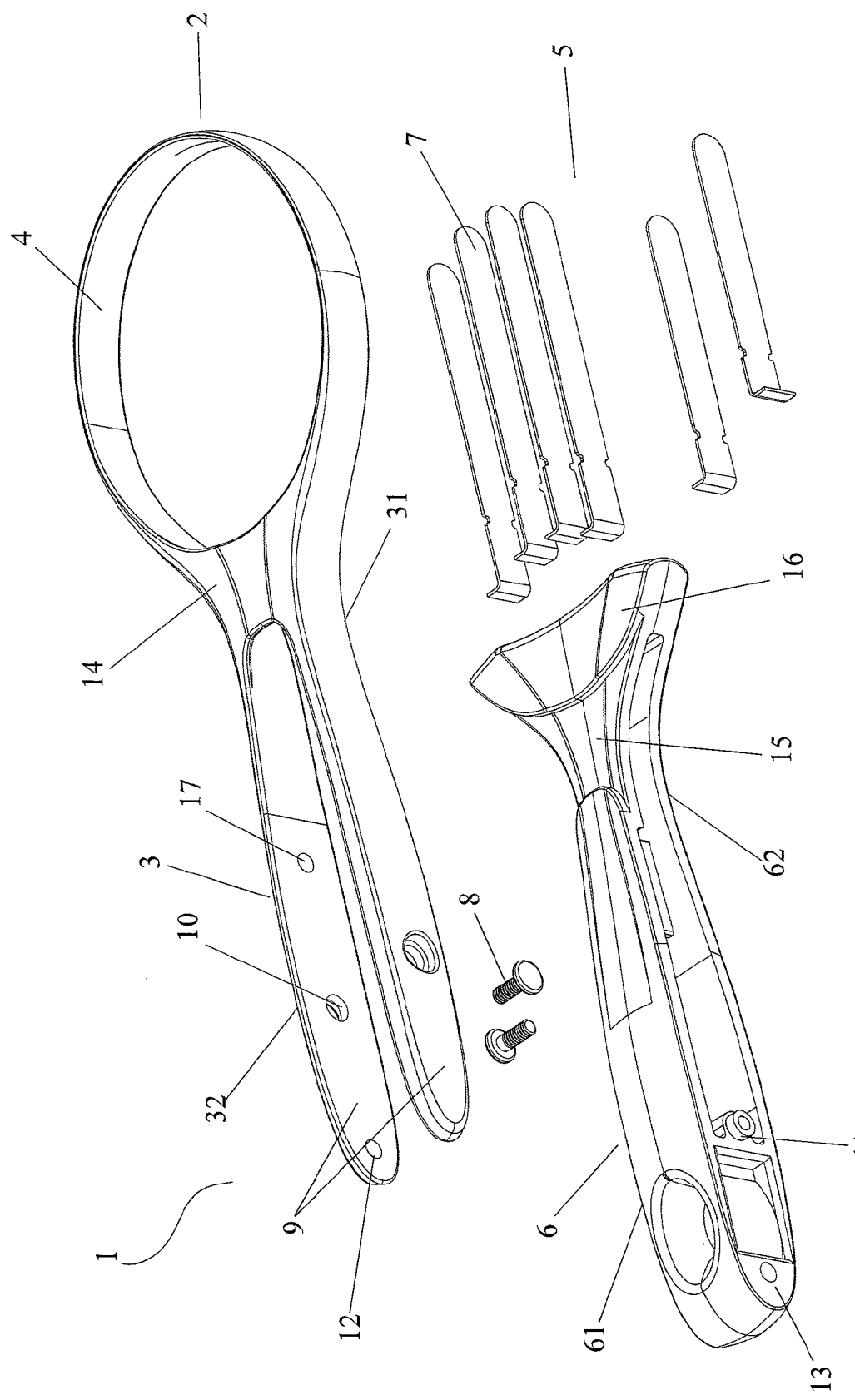
FIG. 1 is an exploded perspective view of a tool for preparing an avocado constructed according to an embodiment of the present invention.

Referring now to the drawings, FIG. 1 illustrates in an exploded perspective view of a tool for preparing an avocado according to a preferred embodiment of the present invention. The tool 1 comprises a scoop 2 and a slicer 5. The scoop 2 comprises a scoop handle 3 having a first end portion 31 and a second end portion 32 which are opposite to each other, and a loop 4 extending from the first end portion 31 and adapted for scooping out pulp of the avocado. In this embodiment, the loop 4 is of an oval shape, which may be of any shape if desirable. The slicer 5 comprises a slicer handle 6 having a first end portion 61 and a second end portion 62 which are opposite to each other, and a plurality of slicing elements 7 mounted to the second end portion of the slicer handle. The first end portion 61 of the slicer handle 6 is pivotally mounted to the second end portion 32 of the scoop handle 3 through a hinge for moving the slicing elements 7 into the loop 4 or moving the slicing elements 7 away from the loop 4, which will be discussed hereinbelow.

As shown in FIG. 1, the scoop handle 3 has two opposite side panels 9 defining a channel which is capable of accommodating the slicer handle 6. Each of the side panels 9 comprises a transverse hole 10, and the slicer handle 6 comprises a transverse throughhole 11. Two pins 8 serving as a hinge are inserted into the respective transverse holes 10 and into the transverse throughhole 11, thereby pivotally mounting the first end portion 61 of the slicer handle 6 to the second end portion 32 of the scoop handle 3. Alternatively, the first end portion 61 of the slicer handle 6 may also be pivotally mounted to the second end portion 32 of the scoop handle 3 by inserting a single pin (not shown) through the transverse holes 10 and the transverse throughhole 11.

The plurality of slicing elements 7 are mounted to a mounting portion 16 on the second end portion 62 of the slicer handle 6. Preferably, the slicing elements 7 are blades in spaced relation, each of which has a hooked proximal end, and the mounting portion 16 comprises hook-shaped slots for receiving and securing the hooked ends of the slicing elements 7 in place.

Figure 2:
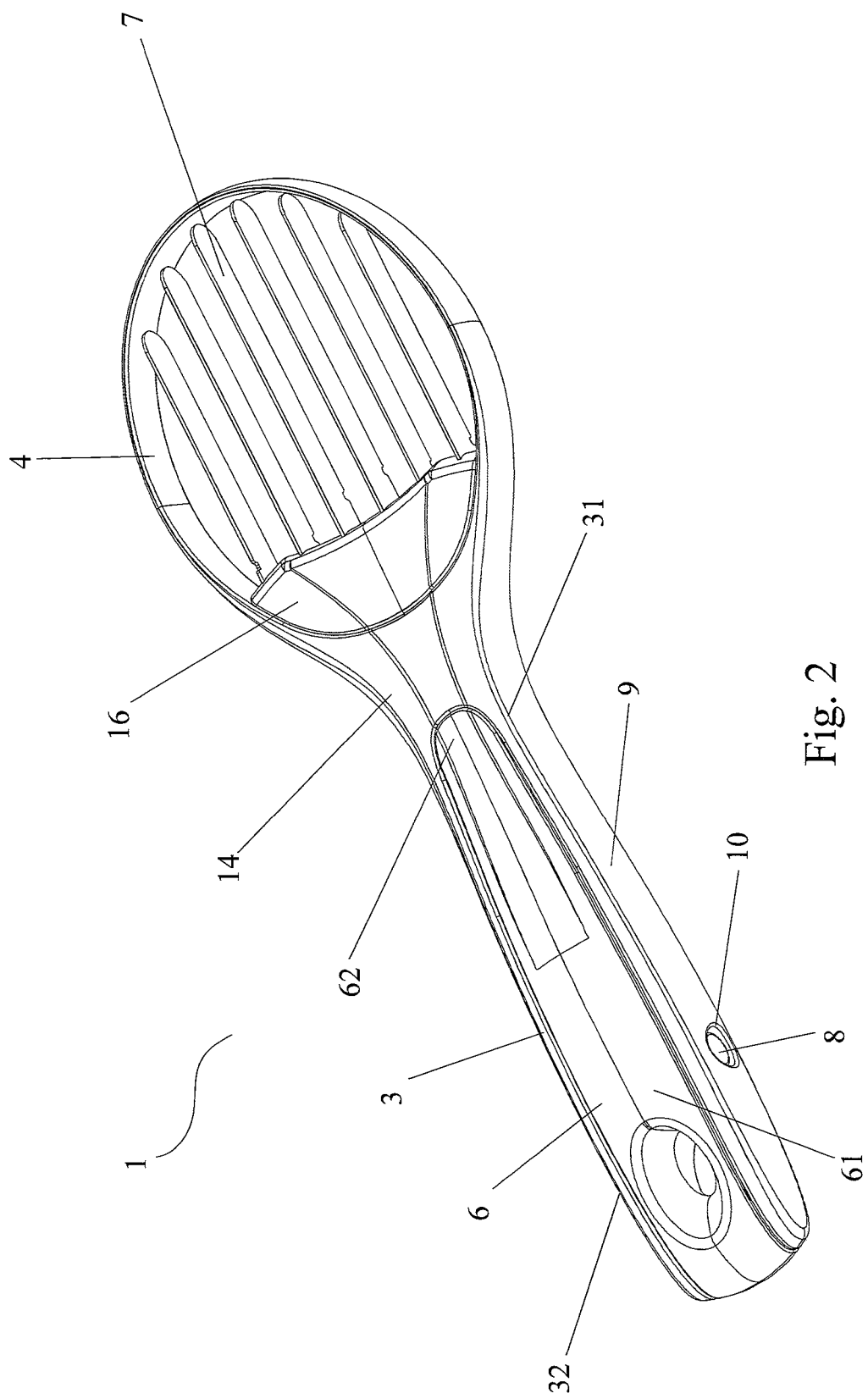
FIG. 2 is a perspective view of the tool shown in FIG. 1 with a loop and slicing elements positioned at a same end of the tool and with the slicing elements positioned within the loop.

FIG. 2 illustrates a first state of the tool according to the embodiment shown in FIG. 1. In this state, the plurality of slicing elements 7 are pivoted into the loop 4 of the scoop 2 and are received within and aligned with the loop 4. In order to lock the tool in this state, a first projection 12 is formed at the second end portion 32 of at least one of the side panels 9 and a corresponding recess 13 is formed on the first end portion 61 of the slicer handle 6 (see FIG. 1). The recess 13 is positioned and configured to snap-fit the first projection 12 so as to prevent movement of the slicer 5 relative to the scoop 2. As a result, in order to transform the tool 1 into another state, an extra force is needed to pivot the scoop 2 and the slicer 5 relative to each other. In other words, the tool 1 is locked in the first state. When applying the tool 1 in the first state to prepare an avocado, the pulp of the avocado will be scooped out by the loop 4, and at the same time sliced into long slices by the plurality of slicing elements 7. Therefore, the slices of avocado are prepared in the first state of the tool.

Figure 3:
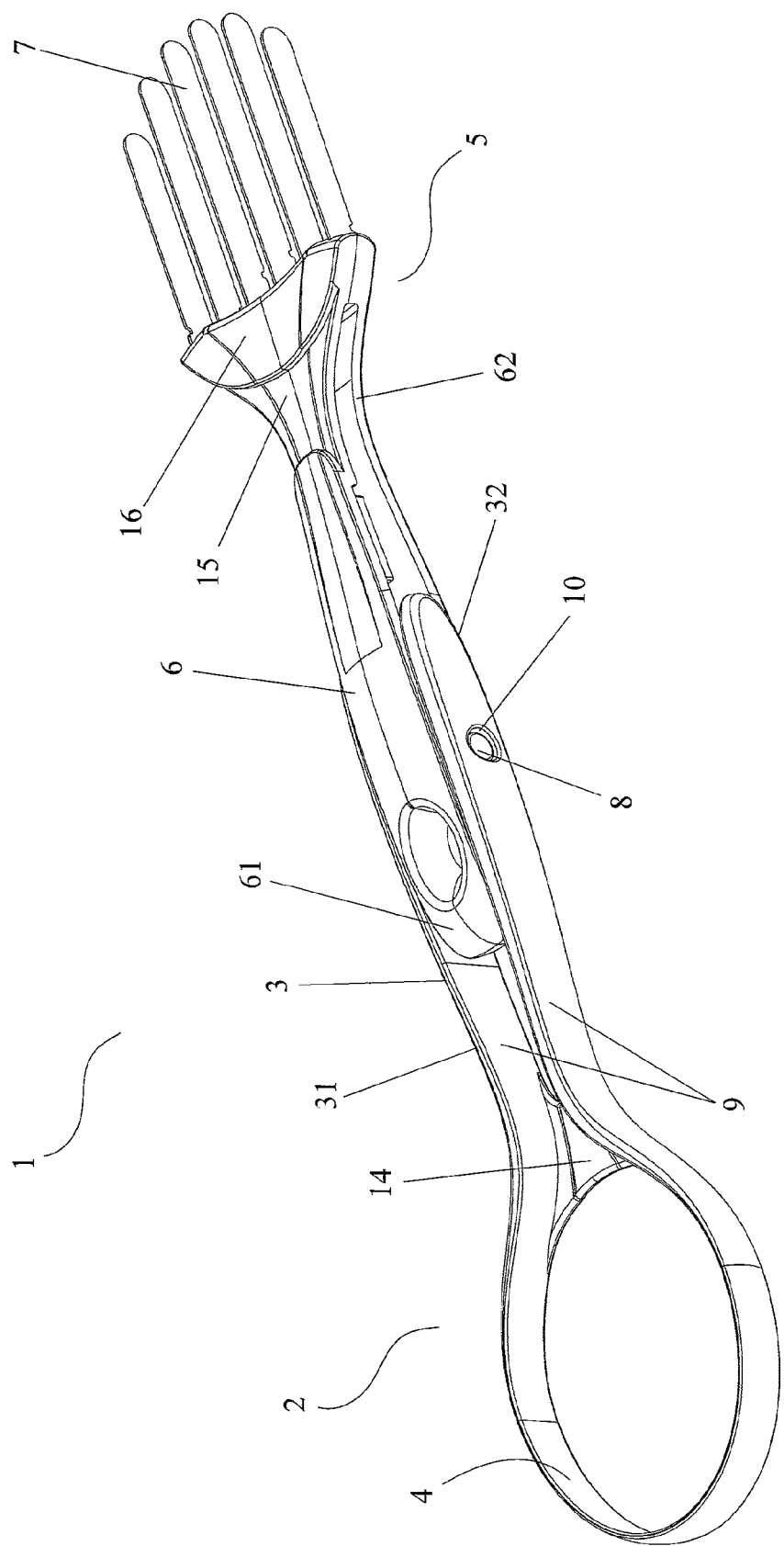
FIG. 3 is a perspective view of the tool shown in FIG. 1 with the loop and the slicing elements positioned at opposite ends of the tool.

A second state of the tool according to the above embodiment is shown in FIG. 3. In this state, the plurality of slicing elements 7 and the loop 4 are pivoted relative to each other to be at opposite ends of the tool 1. In order to lock the tool in this state, a second projection 17 is formed at the first end portion 31 of the scoop of at least one of the side panels 9. The second projection 17 and the first projection 12 are positioned oppositely with regard to the transverse hole 10 and at a same distance from the transverse hole 10. Therefore, when the tool is in the second state, the second projection 17 is received in the recess 13. As a result, the tool 1 is locked in the second state. As the slicing elements 7 and the loop 4 are at opposite ends of the tool 1, they can be used separately to slice the pulp of the avocado or to scoop out the pulp of the avocado, respectively. In this case, the slicing elements are not confined to the loop 4 of the scoop 2 and can slice the pulp of the avocado in various shapes.

As can be seen in FIG. 1, the scoop handle 3 further comprises an intermediate portion 14 adjacent to the loop 4, and a surface 15 of the slicer handle 6, which is positioned to correspond to the intermediate portion 14, is adapted to receive the intermediate portion 14 in flush fashion when the tool 1 is in the first state.

When a user wants to scoop out the whole pulp of the avocado, the tool 1 will be transformed into the second state by relative pivoting of the scoop 2 to the slicer 5, and the loop 4, from which the slicing elements 7 are separated and moved away, will be used to scoop out the pulp. On the other, the separated slicing elements 7 may be used to slice the pulp into elongate slices, cubic blocks, triangular blocks or any shape that is desirable to the user.

If the user wants to prepare the avocado in elongate slices, the tool 1 will be transformed into the first state wherein the slicing elements 7 are received within the loop 4. When applied to the avocado, the loop 4 will scoop out the pulp, while the slicing elements 7 slice the pulp into elongate slices simultaneously.

One of the advantages of the tool according to the present invention is that it can be used to prepare the avocado in any desirable shape, for example cubic blocks. To do so, the tool 1 will first be applied in the second state to produce lateral cuts in the pulp of the avocado using the slicing elements 7. Then the tool 1 will be transformed into the first state by pivoting the scoop 1 and the slicer 5 relative to each other. After the transformation, the tool 1 in the first state will be applied to scoop out the pulp of the avocado, with the slicing elements 7 slicing the pulp longitudinally at the same time. As a result, the scooped out avocado pulp will be in cubical shapes.

While the present invention is described in connection with what is presently considered to be the most practical and preferred embodiment, it should be appreciated that the invention is not limited to the disclosed embodiment, and is intended to cover various modifications and equivalent arrangements included within the spirit and scope of the claims. Modifications and variations in the present invention may be made without departing from the novel aspects of the invention as defined in the claims, and this application is limited only by the scope of the claims.

NUMERICAL REFERENCES 1 tool for preparing an avocado
2 scoop
3 scoop handle
4 loop
5 slicer
6 slicer handle
7 slicing element
8 pin
9 side panel
10 transverse hole
11 throughhole
12 first projection
13 recess
14 intermediate portion
15 surface
16 mounting portion
17 second projection
31 first end portion of the scoop handle
32 second end portion of the scoop handle
61 first end portion of the slicer handle
62 second end portion of the slicer handle

What is claimed is:

1. A tool (1) for preparing an avocado, comprising:
a scoop (2) comprising a scoop handle (3) having first and second end portions (31, 32), and a loop (4) extending from the first end portion (31) of the scoop handle (3) and adapted for scooping out pulp of the avocado; and a loop (4) extending from the first end portion (31) of the scoop handle (3) and adapted for scooping out pulp of the avocado; and a slicer (5) comprising a slicer handle (6) having a first end portion (61) pivotally mounted to the second end portion (32) of the scoop handle (3) and a second end portion (62), and a plurality of slicing elements (7) adapted for slicing the pulp of the avocado and mounted to the second end portion (62) of the slicer handle (6);

wherein the scoop (2) and the slicer (5) are configured and adapted to be pivotable relative to each other between a first state wherein the plurality of slicing elements (7) pivot into the loop (4) so as to be received within the loop (4) of the scoop (2) where the plurality of slicing elements (7) are surrounded by an entire periphery of the loop (4), and a second state wherein the plurality of slicing elements (7) and the loop (4) are positioned at opposite ends of the tool (1).

2. The tool (1) according to claim 1, wherein the first end portion (61) of the slicer (5) is pivotally mounted to the second end portion (32) of the scoop handle (3) through a hinge for moving the slicing elements (7) into the loop (4) or moving the slicing elements (7) away from the loop (4).

3. The tool (1) according to claim 1, wherein the scoop handle (3) has two opposite side panels (9) to define a channel adapted for accommodating the slicer handle (6) when the slicing elements (7) pivots into the loop (4).

4. The tool (1) according to claim 3, wherein at least one of the side panels (9) comprises a first projection (12) at the second end portion (32) of the scoop handle, and the slicer handle (6) comprises at least one recess (13) configured to snap-fit the first projection (12) when the slicing elements (7) pivots into the loop (4), so as to prevent movement of the slicer (5) relative to the scoop (2).

5. The tool (1) according to claim 3, wherein at least one of the side panels (9) comprises a second projection (17) at the first end portion (31) of the scoop handle, and the slicer handle (6) comprises at least one recess (13) configured to snap-fit the second projection (17) when the slicing elements (7) and the loop (4) are at opposite ends of the tool (1), so as to prevent movement of the slicer (5) relative to the scoop (2).

6. The tool (1) according to claim 1, wherein the scoop handle (3) comprises an intermediate portion (14) between the scoop handle (3) and the loop (4), and a surface (15) of the slicer handle (6), which is positioned to correspond to the intermediate portion (14), is adapted to receive the intermediate portion (14) in flush fashion when the slicing elements (7) pivots into the loop (4).

7. The tool (1) according to claim 1, wherein the slicing elements (7) consist in blades in spaced relation, each of which has a hooked proximal end firmly held in respective hook-shaped slots of the second end portion (62) of the slicer handle (6).

8. The tool (1) according to claim 1, wherein the plurality of slicing elements (7) are in alignment with the loop (4) when received within the loop (4) of the scoop (2).

9. A tool (1) for preparing an avocado, comprising:

a scoop (2) comprising a scoop handle (3) having first and second end portions (31, 32), and a loop (4) extending from the first end portion (31) of the scoop handle (3) and adapted for scooping out pulp of the avocado; and a slicer (5) comprising a slicer handle (6) having a first end portion (61) pivotally mounted to the second end portion (32) of the scoop handle (3) and a second end portion (62), and a plurality of slicing elements (7) mounted to the second end portion (62) of the slicer handle (6);

wherein the plurality of slicing elements (7) are configured and adapted to pivot into the loop (4) so as to be received within the loop (4) of the scoop (2);

and further providing that the scoop handle (3) has two opposite side panels (9) to define a channel adapted for accommodating the slicer handle (6) when the slicing elements (7) pivots into the loop (4).

10. The tool (1) according to claim 9, wherein at least one of the side panels (9) comprises a first projection (12) at the second end portion (32) of the scoop handle, and the slicer handle (6) comprises at least one recess (13) configured to snap-fit the first projection (12) when the slicing elements (7) pivots into the loop (4), so as to prevent movement of the slicer (5) relative to the scoop (2).

11. The tool (1) according to claim 9, wherein the slicing elements (7) consist in blades in spaced relation, each of which has a hooked proximal end firmly held in respective hook-shaped slots of the second end portion (62) of the slicer handle (6).

12. The tool (1) according to claim 9, wherein at least one of the side panels (9) comprises a second projection (17) at the first end portion (31) of the scoop handle, and the slicer handle (6) comprises at least one recess (13) configured to snap-fit the second projection (17) when the slicing elements (7) and the loop (4) are at opposite ends of the tool (1), so as to prevent movement of the slicer (5) relative to the scoop (2).

13. A tool (1) for preparing an avocado, comprising:

a scoop (2) comprising a scoop handle (3) having first and second end portions (31, 32), and a loop (4) extending from the first end portion (31) of the scoop handle (3) and adapted for scooping out pulp of the avocado; and a slicer (5) comprising a slicer handle (6) having a first end portion (61) pivotally mounted to the second end portion (32) of the scoop handle (3) and a second end portion (62), and a plurality of slicing elements (7) adapted for slicing the pulp of the avocado and mounted to the second end portion (62) of the slicer handle (6);

wherein the plurality of slicing elements (7) pivot into the loop (4) so as to be received within the loop (4) of the scoop (2) where the plurality of slicing elements (7) are surrounded by an entire periphery of the loop (4);

wherein the scoop handle (3) has two opposite side panels (9) to define a channel adapted for accommodating the slicer handle (6) when the slicing elements (7) pivots into the loop (4).

14. The tool (1) according to claim 13, wherein at least one of the side panels (9) comprises a first projection (12) at the second end portion (32) of the scoop handle, and the slicer handle (6) comprises at least one recess (13) configured to snap-fit the first projection (12) when the slicing elements (7) pivots into the loop (4), so as to prevent movement of the slicer (5) relative to the scoop (2).

15. The tool (1) according to claim 13, wherein at least one of the side panels (9) comprises a second projection (17) at the first end portion (31) of the scoop handle, and the slicer handle (6) comprises at least one recess (13) configured to snap-fit the second projection (17) when the slicing elements (7) and the loop (4) are at opposite ends of the tool (1), so as to prevent movement of the slicer (5) relative to the scoop (2).

* * * * *